United States Patent [19]
Jackson

[11] Patent Number: 5,058,312
[45] Date of Patent: * Oct. 22, 1991

[54] EXTERMINATION SYSTEM

[76] Inventor: John C. Jackson, 313 So. Lakeside Dr., Lake Worth, Fla. 33460

[ * ] Notice: The portion of the term of this patent subsequent to Apr. 25, 2006 has been disclaimed.

[21] Appl. No.: 343,009

[22] Filed: Apr. 25, 1989

Related U.S. Application Data

[63] Continuation-in-part of Ser. No. 52,290, May 21, 1987, Pat. No. 4,823,505.

[51] Int. Cl.⁵ .......................... A01M 1/20; A01M 7/20
[52] U.S. Cl. .......................... 43/124; 43/132.1
[58] Field of Search ........................ 43/124, 900, 132.1

[56] References Cited

U.S. PATENT DOCUMENTS

| | | | |
|---|---|---|---|
| 1,288,824 | 12/1918 | Burns | 43/900 |
| 2,319,410 | 5/1943 | Leary . | |
| 2,915,848 | 12/1959 | Griffin . | |
| 2,981,025 | 4/1961 | Woodson . | |
| 3,513,586 | 5/1970 | Meyer et al. . | |
| 3,676,949 | 7/1972 | Ramsey . | |
| 3,782,026 | 1/1974 | Bridges et al. . | |
| 4,001,989 | 1/1977 | Fischer . | |
| 4,028,841 | 6/1977 | Lundwall . | |
| 4,648,202 | 3/1987 | Renth . | |
| 4,742,641 | 5/1988 | Cretti . | |
| 4,800,672 | 1/1989 | Jackson . | |
| 4,823,505 | 4/1989 | Jackson | 43/124 |
| 4,945,673 | 8/1990 | Lavelle | 43/124 |

*Primary Examiner*—Kurt Rowan
*Attorney, Agent, or Firm*—Eckert Seamans Cherin & Mellott

[57] ABSTRACT

An extermination system provides for the introduction of insecticide within the wall cavities of a building to provide for effective extermination of insects nesting in and passing through the wall cavities. The system includes fittings which are installed through a panel or surface of the wall and which provide a passage to the wall cavity. The fitting passage is adapted to receive the outlet of an insecticide supply device, whereupon an insecticide can be injected directly into the wall space to exterminate insects within the wall space. An insecticide supply device suitable for use with the invention is also disclosed. The invention provides an effective extermination system which will reduce the exposure of the occupants of the building to insecticide.

22 Claims, 5 Drawing Sheets

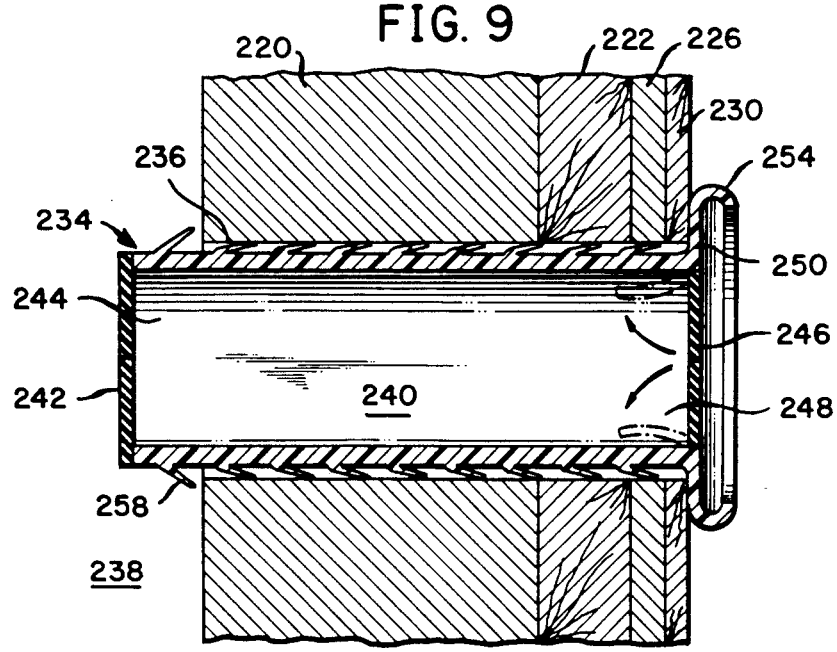
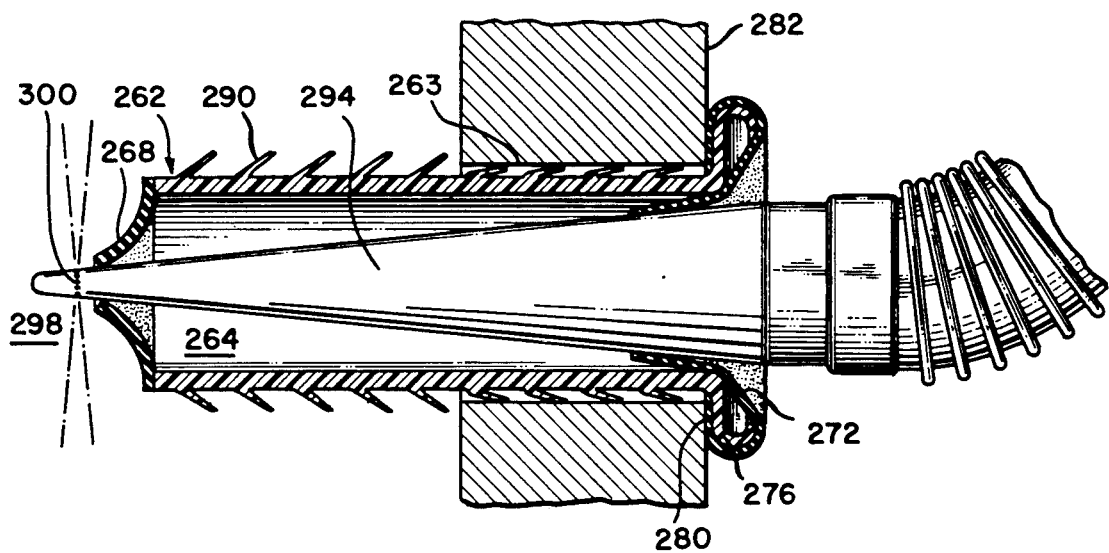

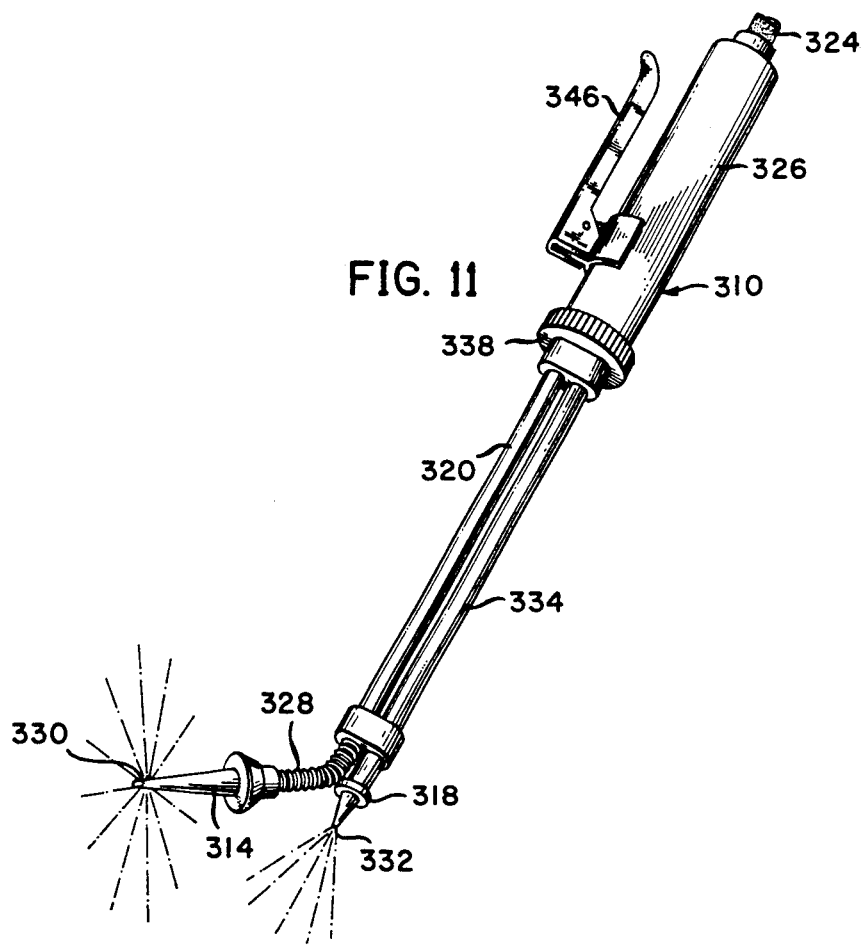
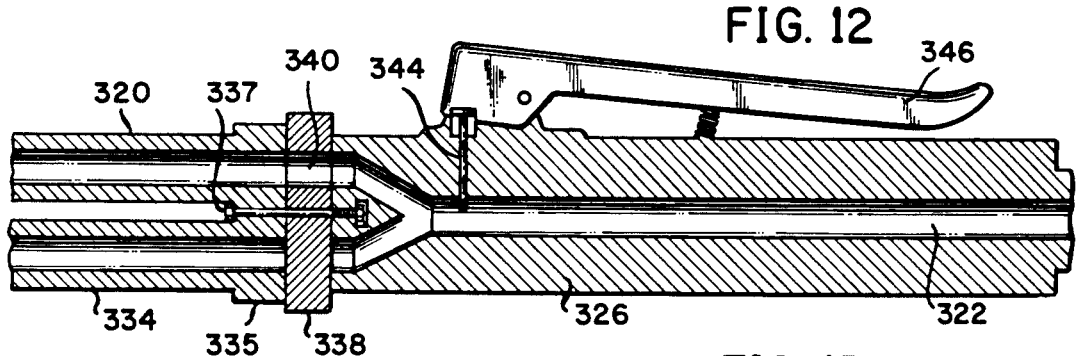
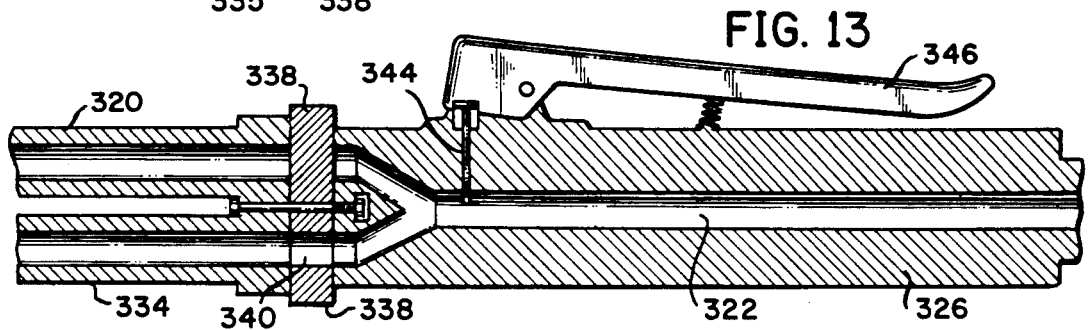

EXTERMINATION SYSTEM

CROSS REFERENCE TO RALTED APPLICATIONS

This application is a continuation-in-part application of Applicant's co-pending U.S. application Ser. No. 052,290, filed May 21, 1987, now U.S. Pat. No. 4,823,505.

BACKGROUND OF THE INVENTION

1. Field of the Invention

This invention relates generally to insect extermination systems, and more particularly to interior insect extermination systems.

2. DESCRIPTION OF THE PRIOR ART

The control of insects within buildings is an ever-present problem. A number of alternative methods and systems for exterminating insects within buildings have been practiced. Prior extermination systems typically rely on the direct application of insecticide to the interior surfaces of the building. Persistent insect problems require more extensive treatment with insecticide, which is often accomplished by the release of a pressurized fumigant from an aerosol container, or by enclosing the entire building in a sealing "tent" and injecting a fumigant within the tent to thoroughly penetrate both interior and exterior portions of the building.

The direct application of insecticide is useful only to kill mature insects traveling through the rooms of a building, but does not effect the nesting sites and points of entry of insects into the building. The tenting process is very time consuming and expensive, and is difficult to perform on larger buildings. It would be desirable to provide an extermination system which can be readily applied to many different types and sizes of buildings.

Prior extermination techniques also subject the room surfaces of a building to substantial direct contact with insecticide. Exposure of the occupants of the building to the insecticide and its odors is discomforting, and with some insecticides, exposure is potentially dangerous. It is therefore desirable to provide an extermination system which will effectively exterminate insects, but which can minimize the exposure of occupants of the building to insecticides.

SUMMARY OF THE INVENTION

It is an object of the invention to provide an extermination system which will effectively exterminate insects within a building.

It is another object of the invention to provide an extermination system which can reduce the exposure of the occupants of a building to insecticides.

It is yet another object of the invention to provide an extermination system which will facilitate the application of insecticide within the building.

It is still another object of the invention to provide an extermination system which can be utilized on many different types and sizes of buildings.

It is yet another object of the invention to provide an extermination system which is easily installed in existing buildings.

It is still another object of the invention to provide an extermination system which is useful in buildings having a variety of different wall designs and constructions.

These and other objects are accomplished by an extermination system in which fittings are installed in wall panels or surfaces to provide for access to interior wall cavities. The fittings have at least one passage adapted to receive the outlet of an insecticide supply device. The outlet is connected to placed through the fitting passage, whereupon the insecticide can be introduced into the wall cavity. The introduction of insecticide into the wall cavities of a building provides for a thorough extermination of insects, including those found at nesting sites and points of entry into the building. The invention is useful for both exterior and interior walls, and for a plurality of different wall designs including frame, stucco, and cement block constructions. The invention is also useful in other building structures which have interior voids, for example, roof spaces and electrical wiring passages.

The fittings preferably have an elongated body adapted for placement within an aperture formed in a wall panel. The fittings have a fitting passage therethrough to direct insecticide from an insecticide supply device into the wall cavity. It is preferable that the interior contour of the fitting passage at some point substantially mate with the contour of the outlet of the insecticide supply device to provide an effective seal between the outlet and the sides of the fitting passage. This will prevent the return flow of insecticide through the fitting passage.

It is also possible to form a seal between the insecticide supply device and the fittings through exterior seal structure. An end of the fitting, for example, can have a circumferential flange adapted to engage a cooperating, circumferential protrusion on the outlet of the insecticide supply device to form a tight and secure seal.

The fitting is installed through a suitable aperture in a wall panel and can be retained by structure suitable for this purpose. The fitting will preferably have an interior end, that is positioned substantially within or adjacent to the wall cavity at an interior surface of the wall panel, and an exterior end extending substantially to or slightly beyond an exterior surface of the wall panel. A suitable stop such as a circumferential stop flange can be provided at the exterior end of the fitting to prevent slippage of the fitting through the aperture and into the wall cavity. A portion of the stop flange will normally abut the surface of the wall panel so as to also form a circumferential seal between the wall surface and the fitting, which will retard the return flow of insecticide through any spaces between the fitting and the aperture.

A plurality of projections from an exterior surface of the fitting can also be utilized to retain the fitting in the aperture. These projections can be of several suitable designs, but preferably are flexible fins which are substantially pliable to bending forces in the direction of the exterior end of the fitting, but which are substantially rigid to bending in forces in an opposite direction. The fins will bend as the fitting is inserted into the aperture, but will flex outward after passage through the aperture to engage the interior surface of the wall panel about the aperture, and thereby to prevent removal of the fitting. Other retaining structure is possible.

Additional seals can be provided to prevent the return flow of insecticide through the fitting passage. An access seal can be placed over an interior opening of the fitting passage to prevent backflow of insecticide through this opening. Additionally, a cover seal can be provided at an exterior opening of the fitting passage. The cover seal closes the exterior opening of the fitting passage to provide a more attractive appearance, and can also prevent the return flow of insecticide from the wall cavity through the fitting passage.

The invention also provides an insecticide supply device which facilitates the injection of insecticide into wall cavities. The device includes a source of insecticide, which is preferably pressurized, and at least one valve to control the flow of insecticide from the source. The device has two injection nozzles. A first, interior injection nozzle is adapted to cooperate with the fittings of the invention to provide for the injection of insecticide into the wall cavities. The interior nozzle is preferably fixed to a flexible conduit to allow for easy insertion into fittings that are low to the ground or in hard-to-reach locations. The interior nozzle preferably has a plurality of radially oriented outlet ports to provide for a substantially radial release of insecticide into the wall cavity. This will provide for adequate coverage of the wall cavity with the insecticide. A second, exterior nozzle provides for a substantially directed spray of insecticide to selectively treat baseboards and the like in the traditional manner. A valve is preferably provided to permit switching of the flow of insecticide between the interior nozzle and the exterior nozzle.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 9 is a cross section, partially in phantom, of a fitting according to the invention as installed in a concrete block wall.

FIG. 10 is a cross section of an alternative fitting according to the invention, and having positioned therein the outlet of an insecticide supply device, which is shown in elevation.

FIG. 11 is a perspective view of an insecticide supply device according to the invention.

FIG. 12 is a cross section of the insecticide supply device of FIG. 11 in a first mode of operation.

FIG. 13 is a cross section of the insecticide supply device of FIG. 11 in a second mode of operation.

DETAILED DESCRIPTION OF THE PREFERRED EMBODIMENT

Elements of Applicant's invention are set forth in Applicant's co-pending U.S. Pat. application Ser. No. 052,290, to be U.S. Pat. No. 4,823,505. The teachings of this application and patent are hereby incorporated by reference. According to the invention, fittings or "tunnel devices" are provided through the panel surfaces and panels of walls, and provide a means for accessing wall cavities to inject an insecticide into this space for the extermination of insects within the cavity. The present invention is directed to improved fittings and insecticide injection devices for use in such a system. The system has utility in a variety of different wall constructions, including both exterior walls and interior walls, and in walls of cement-block, frame, stucco, or alternative constructions.

Figure 1:
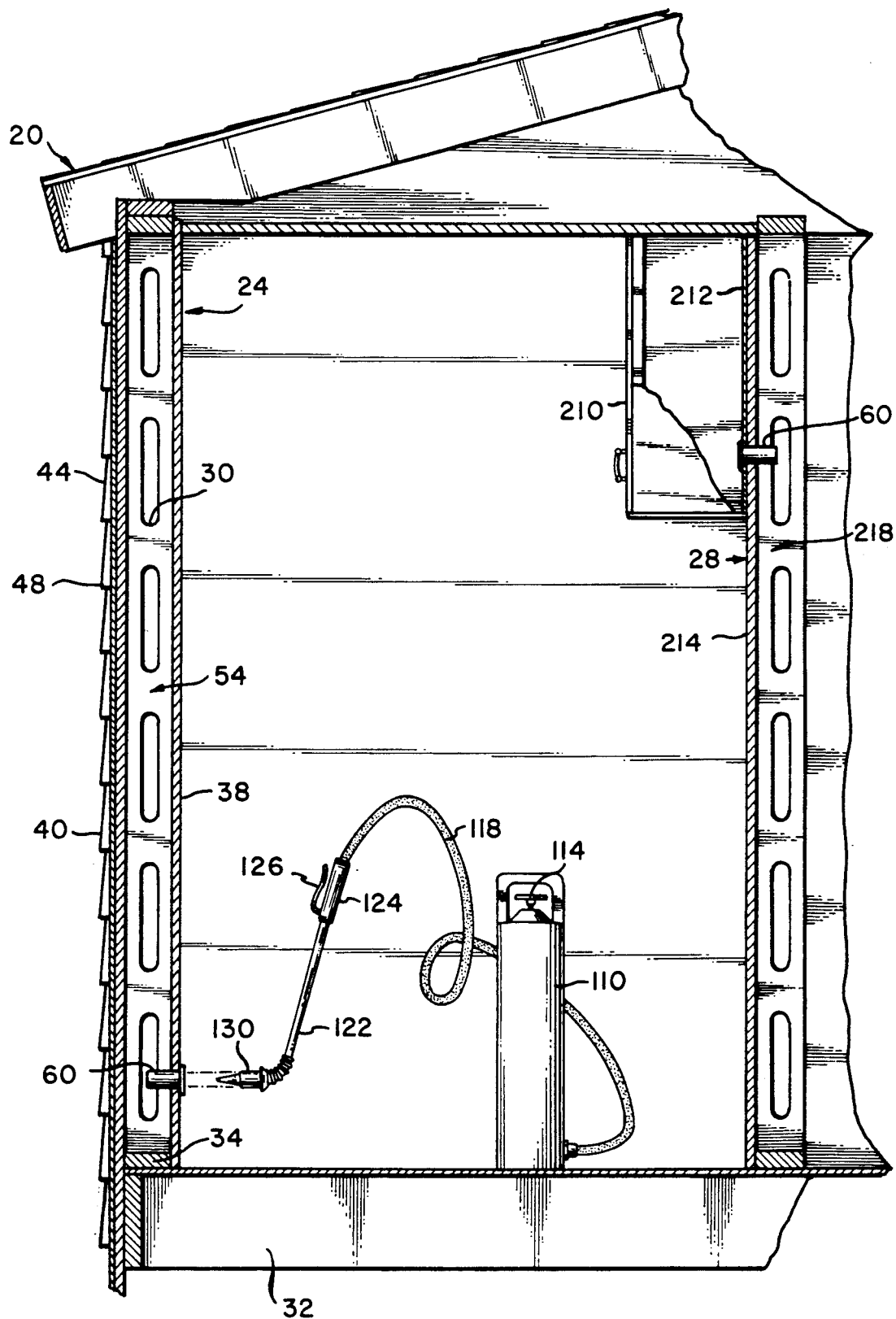
FIG. 1 is a cross section, partially in elevation and partially broken away, of a portion of a building having the extermination system of the invention.
Figure 2:
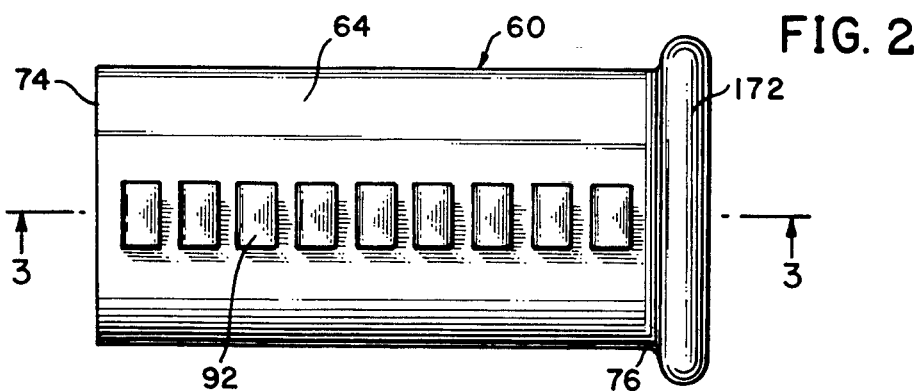
FIG. 2 is a plan view of a fitting according to the invention.

An extermination system according to the invention is shown in FIG. 1. A building 20 includes an exterior wall 24 and an interior wall 28. The exterior wall 24 includes a number of upstanding studs such as the metal stud 30 which are fixed to a foundation 32 of the building through suitable attachment structure such as the stud track 34. The frame construction shown is capable of many modifications currently practiced in the art, but in this embodiment has indoor panels 38 of a suitable material such as plasterboard. The indoor panels 38 are fixed to the studs 30 to form a wall of the building 20. Outdoor panels 40 of exterior plywood or another suitable structural material are fixed to an opposite side of the studs 30 to form an exterior wall surface of the building 20. A suitable sealing material 44 can be provided to weather-proof the outdoor panels 40, and a suitable covering such as the decorative siding 48 can be provided to improve the appearance and durability of the wall. A wall cavity 54 is created between the indoor panels 38 and the outdoor panels 40. The wall cavity 54 is often inhabited by insects, and serves as a site for nesting and access to the interior of the building.

The invention provides fittings 60 which are positioned through apertures in either of the wall cavity 38 or outdoor panels 40 as a means of accessing the wall cavity 54. Each fitting 60 includes a fitting passage adapted to permit the insertion of the outlet of an insecticide injection device. Insecticide can then be injected into the wall cavity 54 to exterminate insects occupying the space. The injection of insecticide into the wall cavity 54 provides an effective means for applying insecticide to the nesting sites of insects and to their entry points into the building, and also helps to isolate the insecticide from the occupants of the building. The exposure of the occupants to discomforting odors or dangerous chemicals will thereby be substantially reduced.

A fitting 60 according to the invention is shown in FIGS. 2-5. The fitting 60 can include an elongated main body portion 64 through which is provided an open interior fitting passage 68. The fitting passage 68 provides a means for accessing the wall cavity 54 with an insecticide supply device. The fitting 60 is positioned in a suitable aperture 72 in the wall panel 38. An interior end 74 of the fitting 60 is thereby positioned in or substantially adjacent to the wall cavity 54. An opposite, exterior end 76 of the fitting 60 is positioned substantially at an opposite side of the wall panel 38. The fitting passage 68 extends from an inlet opening 80 at the exterior end 76, through the fitting 60, to an outlet opening 84 at the interior end 74 of the fitting 60.

Suitable structure is preferably provided to secure the fitting 60 within the aperture 72 of the wall panel 38. One such suitable structure is a circumferential stop flange 88, which can be provided about the exterior end 76. The stop flange 88 is preferably substantially perpendicular to the elongated body 64 of the fitting 60 so as to evenly abut a surrounding surface of the wall panel 38 and to prevent passage of the fitting 60 through the aperture 72 and into the wall cavity 54. Removal of the fitting 60 in the opposite direction is preferably prevented by a series of upstanding projections on the elongated body 64 which engage a portion of the wall panel 38. The upstanding projections can be a series of longitudinally aligned, flexible retaining fins 92. The fins 92 are angled toward the exterior end 76 of the fitting 60. The fins 92 will thereby be flexible to forces in the direction of the exterior end 76 so as to permit insertion of the fitting 60 through the aperture 72, whereupon the fins 92 will bend in the manner depicted by the fins 92a. Fins 92b within the wall cavity 54 flex outward under the action of their own elasticity, and will engage a portion of an interior surface of the wall panel 38 surrounding the aperture 72 to prevent removal of the fitting 60 in the direction of the exterior end 76. The fitting 60 will thereby be secured within the aperture 72.

The fittings of the invention in a preferred embodiment provide closure structure adapted to retard or prevent the return flow of insecticide through the fitting passage. The structure is preferably a seal structure between an open position and a closed position. The seal in the closed position prevents the return flow of insecticide from the wall cavity 54 through the fitting passage 68 to the inlet opening 80. The seal can be provided as an access seal 96 which covers the outlet opening 84 of the fitting passage 68. The access seal 96 can be hingeably mounted to the interior end 74 of the fitting 60 through a thin bridge portion 100 which provides the requisite flexibility for pivotal movement of the access seal 96. The bridge 100 is adapted to elastically return the access seal 96 to the closed position depicted in FIG. 4 unless acted upon by an exterior force, usually provided by the insertion of the outlet of an insecticide supply device into the fitting passage 68. The device will move the access seal 96 to the open position depicted by the phantom lines in FIG. 4. The access seal 96 will thereby permit the introduction of insecticide into the wall cavity 54, but will substantially prevent the return flow of insecticide through the fitting passage 68 after the insecticide supply device has been removed from the fitting 60.

Alternative seal structure can be provided as a cover seal 104, at the inlet opening 80. The cover seal 104 can be hingeably mounted to the body 64 of the fitting 60 by a thin bridge portion 106. The bridge 106 acts elastically to return the cover seal 104 to the closed position depicted in FIG. 4 Insertion of the insecticide supply device into the fitting 60 will cause the cover seal 104 to pivot about the hinge 106 to the open position depicted by the phantom lines in FIG. 4. The cover seal 104 will help to prevent the return flow of insecticide through the fitting 60, but will also close the fitting passage 68 to the view of occupants of the room to provide for a more aesthetically pleasing appearance.

An insecticide supply device is depicted in FIG. 1 and preferably includes a canister 110 of pressurized insecticide, such as a fumigant. It will be appreciated that the invention is also useful with modification for the injection of alternative insecticides in the form of vapors and powders. The canister 110 will typically have a supply valve 114 which controls the outward flow of fumigant through a hose 118. The hose 118 is connected to a wand 122. The wand 122 can have a handle 124 provided with a flow control, preferably in the form of a lever 126. Depression of the lever 126 will operate to permit the flow of insecticide through the wand 122. An outlet such as the nozzle 130 is provided at an opposite end of the wand 122 and serves to direct the flow of insecticide through one or more outlet ports.

Figure 4:
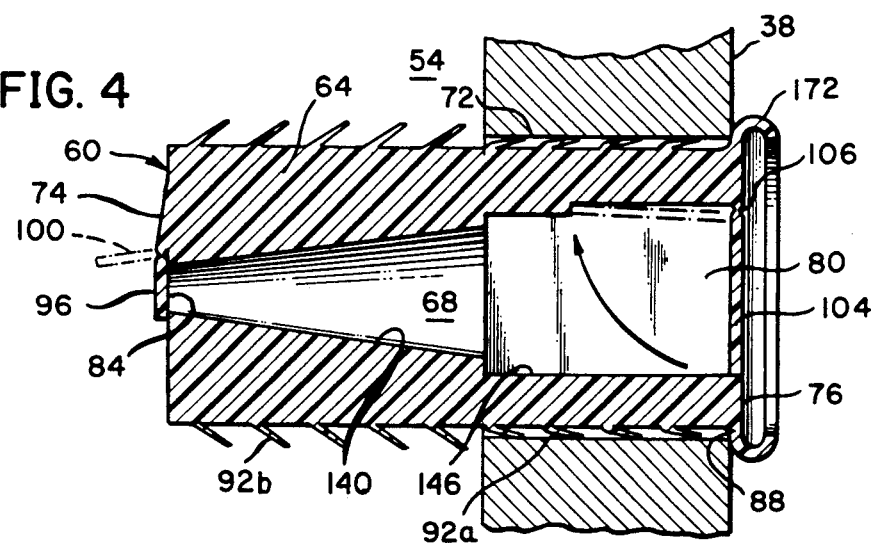
FIG. 4 is a cross section of the fitting as taken along line 3—3 in FIG. 2 and as installed in a wall panel.
Figure 5:
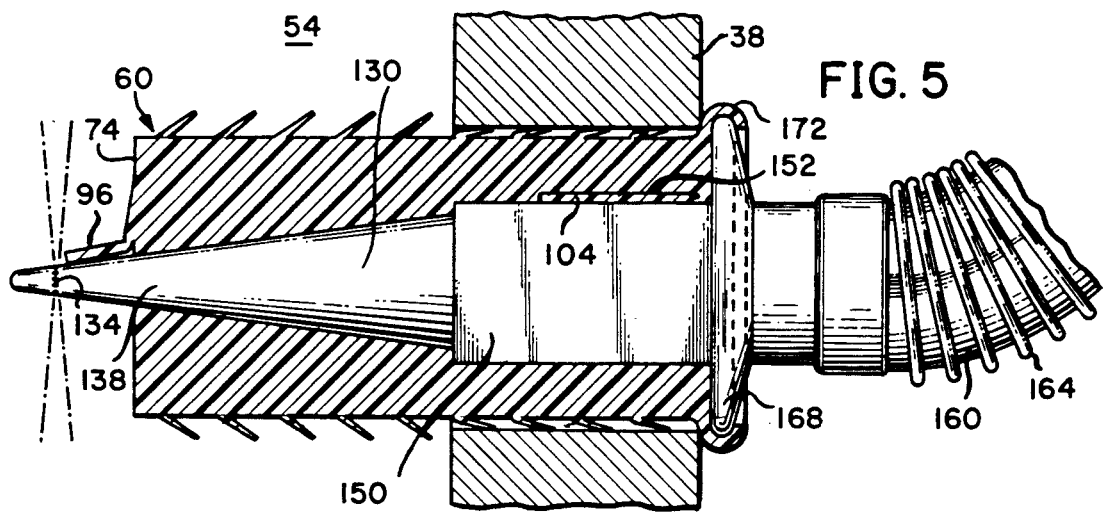
FIG. 5 is a cross section of a fitting according to the invention, showing an insecticide supply device in elevation.
Figure 3:
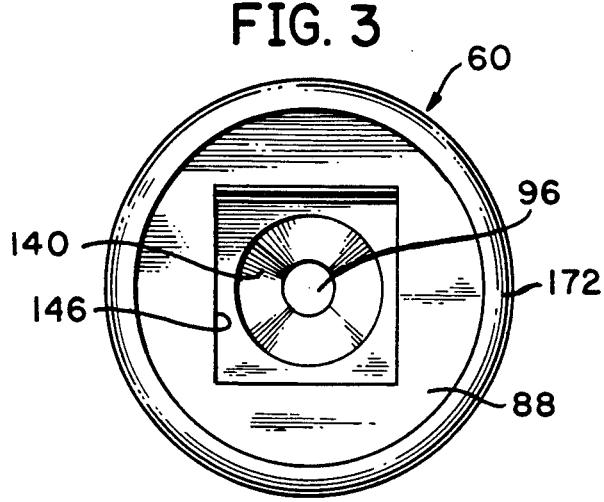
FIG. 3 is an end view.

It is presently preferred to provide a series of radial outlet ports 134 in the nozzle 130 which provide for a substantially circumferential spray in the manner depicted in FIG. 5. The nozzle 130 may have a conical tip portion 138, in which case the fitting passage 68 is preferably provided with a corresponding conical passage portion 140 (FIG. 4) to permit the nozzle 130 to firmly seat against the sides of fitting passage 68, so as to prevent the return flow of insecticide through the fitting passage 68 and around the nozzle 130.

A rectangular fitting passage portion 146 is provided to permit the rectangular cover seal 104 to swing upward in the manner depicted by the phantom lines in FIG. 4. The nozzle 130 can be provided with a corresponding rectangular nozzle portion 150, which will seat in the rectangular fitting passage portion 146 when the nozzle 130 is inserted into the fitting passage 68. A recess 152 for the cover seal 104 is formed in the elongated body 64 to permit an even seating of the rectangular nozzle portion 150 in the rectangular fitting passage portion 146. In this manner a tight seal is established between the nozzle 130 and the fitting passage 68 to prevent the return flow of insecticide through the fitting passage 68 during the injection process.

The nozzle 130 can be connected to the wand 122 through a flexible connection 160. The flexible connection 160 will flex to allow the ready insertion of the nozzle 130 into the fitting passage 68 from a variety of positions and angles relative to the fitting 60. This is especially useful where the fittings are provided near to the ground or in other difficult locations. Stiffening corrugation 164 or other suitable structure can be provided to adjust the flexibility and elasticity of the flexible connection 160 as desired.

An additional seal between the nozzle 130 and the fitting 60 can be provided through a circumferential projection 168 on the nozzle 130. The circumferential projection 168 abuts the exterior end 76, as at the stop flange 88, to additionally seal the nozzle 130 against the fitting 60. A J-flange 172 can be formed with the stop flange 88, and which will snap-fit over the circumferential projection 168 to firmly engage and secure the nozzle 130 to the fitting 60 during the insecticide introduction process.

Figure 6:
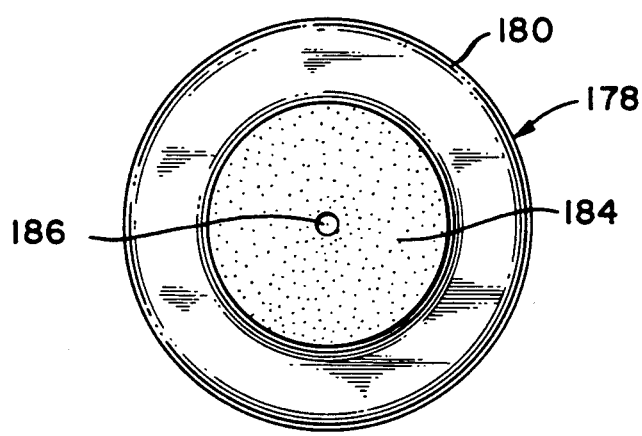
FIG. 6 is an end view of an access seal.

It is possible to provide alternative seal structure. An elastomeric access seal 178 is depicted in FIG. 6. The elastomeric access seal 178 is positioned in the flow path of the fitting passage 68, preferably at the interior outlet 84. The access seal 178 can include a support ring 180 which can be fixed directly to the interior end 74 of the elongated body 64 by suitable means including adhesives. An elastomeric diaphragm 184 is mounted within the support ring 180 and performs the sealing function. A central aperture 186 is provided in the diaphragm 184 and permits the insertion of the tip 138 of the nozzle 130. The aperture 186 expands with insertion of the nozzle tip 138 to permit injection of the insecticide, and contracts following the removal of the nozzle tip 138 to prevent the return flow of insecticide through the fitting passage 68.

Figure 7:
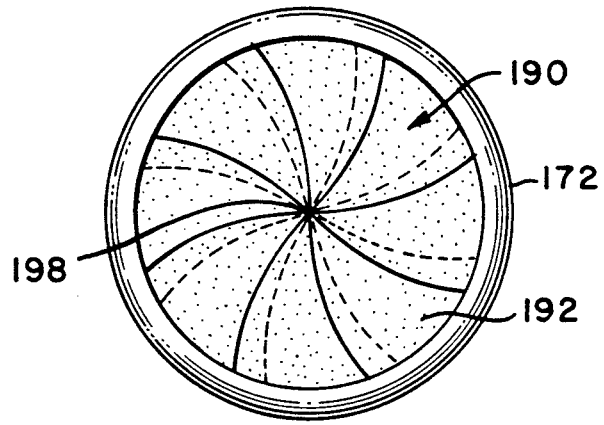
FIG. 7 is an end view of a cover seal.

The cover seal of the inlet opening 80 is also capable of taking alternative forms. A first alternative embodiment is depicted in FIG. 7. The cover seal 190 is mounted to the fitting 60 and within the J-flange 172 as previously described. Overlapping panels 192 of a flexible, elastic material, are substantially triangular in form fixed at sides thereafter to the fitting 60 and with free ends meeting at a center 198. The nozzle 130 can thereby be pushed through the cover seal 190 and the fitting passage 68 to inject the insecticide into the wall cavity 54. The flexible panels 192 can be biased by their own elasticity to the closed position depicted in FIG. 7, such that withdrawal of the nozzle 130 will close the panels over one another to prevent the return flow of insecticide through the fitting passage 68.

Figure 8:
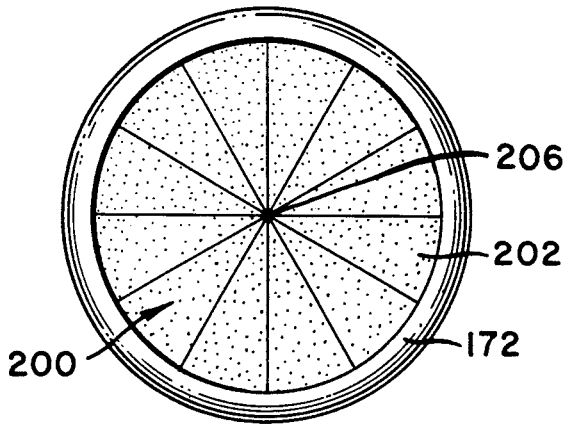
FIG. 8 is an end view of an alternative cover seal.

A second alternative cover seal 200 is depicted in FIG. 8, and comprises triangular panels 202 mounted within the circumferential J-flange 172. The triangular panels 202 have their free ends at a center 206, such that the nozzle 130 can be pushed through the cover seal 200 and into the fitting passage 68 for injection of the insecticide.

The invention is suitable for use with a variety of wall constructions, including interior walls. The fittings 60 can, for example, be provided in interior walls 28 (FIG. 1). It is possible to position the fittings within structures such as the cabinet 210 to obscure the fittings 60 from the view of occupants of the room. The fittings 60 can be provided at a length so as to extend through a back wall 212 of the cabinet 210, through a wall panel, and into a wall cavity 218. Insecticide can thereby be injected into the wall cavity 218 from an out-of-view location in the cabinet 210.

The invention is also suitable for use in concrete-block construction. A suitable embodiment for concrete-block wall constructions is shown in FIG. 9. The wall comprises a concrete-block portion 220, to which a furring strip 222 is fastened. A dry wall panel 226 is fixed to the furring strip 222, and a cabinet wall 230 may also be present. A fitting 234 is of a length so as to extend through an aperture 236 in the several layers of construction and to reach the wall cavity 238. The fitting 234 has a large open interior passage 240 to receive the outlet of an insecticide supply device. A flexible rubber seal 242 can be provided at an outlet opening 244 of the fitting passage 240. A flexible cover seal 246 can be provided over an inlet opening 248. A stop flange 250 and J-flange 254 can also be provided, as described previously. The fitting 234 can be secured in the aperture 236 by flexible fins 258. A suitable insecticide injection nozzle can be pushed through the cover seal 246, opening it to the position depicted by the phantom lines in FIG. 9, and through the access seal 242 to inject insecticide into the wall cavity 238.

A further alternative fitting embodiment is depicted in FIG. 10. The fitting 262 is positioned in an aperture 263 and includes an open interior passage 264 that is closed by a flexible access seal 268 and a flexible cover seal 272, both of which can be constructed as previously described. A circumferential stop flange 276 can also be provided. Panels of the cover seal 272 can be folded over the stop flange 276 to provide a seal surface 280 which will seal the stop flange 276 against a wall panel 282. The fitting 262 is held in the aperture 263 by the provision of flexible fins 290, as previously described. A nozzle 294 of an insecticide supply device can be inserted through the cover seal 272 and access seal 268 to inject insecticide into the wall cavity 298 of the wall through radially-oriented outlet ports 300.

It may be desirable to combine the extermination system of the invention with more traditional techniques, such as the direct application of an insecticide spray onto walls, base boards and the like. An insecticide injection device according to the invention permits the application of insecticide by either method, as is shown in FIGS. 11-13. The insecticide supply device 310 includes a first outlet portion 314 and a second outlet portion 318. The first outlet portion 314 can be connected to a first outlet supply tube 320, which is connected to a common insecticide supply line 322 in a handle 326. The first outlet 314 is preferably mounted to the first outlet supply tube 320 through a flexible hose connection 328, which allows the first outlet 314 to be positioned in a fitting 60 from a variety of different positions and at a variety of different angles relative to the injection device 310. The insecticide is injected into the wall cavity through radial outlet ports 330 in the first outlet 314.

The second outlet 318 has a single outlet port 332 which provides for a directed spray of insecticide on wall surfaces, base boards and the like. The second outlet 318 receives insecticide through a second outlet supply tube 334 which is also connected to the insecticide supply tube 322. The insecticide supply tube 322 can be connected through a flexible hose connection 324 to a suitable insecticide supply source or canister (not shown). Selection between the first outlet 314 and the second outlet 318 is provided by a suitable switching valve such as the rotatable valve gate 338.

The gate 338 has an off-center aperture 340 which in one rotatable position aligns with the first outlet supply tube 320 to permit the flow of insecticide through this path. The second outlet supply tube 334 is blocked from the flow of insecticide. In a second rotatable position of the gate 338, flow through the first outlet supply tube 320 is blocked and the aperture 340 is aligned with the second outlet supply tube 334 to permit the flow of insecticide to the second outlet 318. The supply tubes 320 and 324 can be fixed to a base portion 335. The base portion 335 can be joined to the handle 326 by a screw 337, which passes through an aperture on the gate 338 and engages a threaded opening in the handle 326.

The flow of insecticide through either nozzle is controlled by a suitable control valve 344, which can be transversely mounted through the insecticide supply line 322. The valve 344 is manipulated by the action of a control lever 346 which acts to move the valve 344 into and out of the flow path of the insecticide supply tube 322. It is alternatively possible to control the flow of insecticide to the outlets through valves operated by multiple trigger mechanisms which allow for the selective application of insecticide with the use of a single finger.

It is possible to provide fittings which do not extend through the aperture but rather are formed substantially as cover plates which fit over the apertures, and can be attached to the wall by suitable fastening structure such as screws. The cover plates can have apertures adapted to mate with the outlet of an insecticide supply device to form a seal therebetween. Alternate seal structure as elsewhere disclosed herein, such as elastic diaphragm or panels of a flexible material, could be provided.

This invention can be embodied in other specific forms without departing from the spirit or essential attributes thereof. The shape, size and design of the fittings, fitting passages, seals, outlets and other components of the invention are subject to modification or improvement. Accordingly, reference should be had to the following claims, rather than to the foregoing specification, as indicating the scope of the invention.

I claim:

1. An extermination system for installation into the walls of buildings, said walls comprising opposing wall surfaces defining an interior wall cavity, said surfaces having a plurality of apertures for accessing said wall cavity in a plurality of locations, said extermination system comprising:
- a plurality of fittings, one of said fittings being installed and mated in each of said apertures, each fitting having an open interior fitting passage adapted for introduction of an insecticide into said wall cavity through said fitting passage;
- a portable insecticide supply device, said device including an outlet portion removable from said fitting and capable of introducing insecticide into said wall cavity through said fitting passage, and an insecticide supply portion connected to said outlet portion, whereby insecticide can be introduced into said wall cavities at locations selected from said plurality of fittings to exterminate insects therein, and whereby said insecticide will be separated by said wall surfaces from occupants of said building.

2. The extermination system of claim 1, wherein said fitting comprises an interior end and an exterior end, said interior end being positioned substantially at an end of said aperture adjacent to said wall cavity, and said exterior end being positioned substantially at an opposite end of said aperture, said exterior end comprising means adapted to engage a portion of said wall surface surrounding said aperture to prevent passage of said fitting through said aperture.

3. The extermination assembly of claim 2, wherein said exterior end further comprises means for sealably engaging a portion of said outlet of said insecticide supply device to seal the insecticide supply device against the fitting, whereby the return flow of insecticide through the fitting and around the outlet will be substantially prevented.

4. The extermination assembly of claim 1, wherein said fitting comprises an interior end substantially positionable in said wall cavity, and an exterior end substantially positionable at an opposite side of said wall surface, and further comprises means for preventing the return flow of insecticide from said interior end to said exterior end of said fitting.

5. The extermination assembly of claim 4, wherein said means for preventing the return flow of insecticide comprises seal means having a closed position preventing the flow of insecticide through said fitting passage, and an open position permitting said flow.

6. The extermination assembly of claim 5, wherein said passage comprises an inlet opening substantially at said exterior end of said fitting, and an outlet opening substantially at said interior end of said fitting, said seal means being adapted to close at least one of said inlet opening and said outlet opening.

7. The extermination assembly of claim 1, wherein said outlet comprises a nozzle adapted to mate with said fitting passage so as to prevent the return flow of insecticide through said passage and around said nozzle.

8. An extermination system for installation into the walls of buildings, said walls comprising opposing wall surfaces defining an interior wall cavity, said surfaces having at least one aperture for accessing said wall cavity, said extermination system comprising:
- a fitting installed and mated in said aperture, said fitting having an open interior fitting passage adapted for the introduction of an insecticide into said wall cavity through said fitting passage, said fitting comprising an interior end and an exterior end, said interior end being positioned substantially at an end of said aperture adjacent to said wall cavity, and said exterior end being positioned substantially at an opposite end of said aperture, said exterior end comprising means adapted to engage a portion of said wall surface surrounding said aperture to prevent passage of said fitting through said aperture;
- an insecticide supply device, said device including an outlet portion adapted to introduce insecticide into said wall cavity through said fitting passage, and an insecticide supply portion connected to said outlet portion, said exterior end of said fitting further comprising means for sealably engaging a portion of said outlet of said insecticide supply device to seal the insecticide supply device against the fitting, said sealable engagement means comprising a circumferential flange substantially J-shaped in cross section, said outlet comprising a circumferential protrusion, said circumferential J-shaped flange being adapted to snap-fit over said circumferential protrusion to sealably engage said outlet to said fitting to prevent the return flow of insecticide, whereby insecticide can be introduced into said wall cavities to exterminate insects therein, said insecticide will be separated by said wall surfaces from occupants of said building, and return flow of insecticide through the fitting and around the outlet will be substantially prevented.

9. The extermination assembly of claim 8, wherein said fitting comprises means for retaining said fitting within said aperture, said means comprising laterally outward-directed protrusions, said protrusions being adapted to engage a portion of said wall surface to prevent removal of said fitting.

10. An extermination system for installation into the walls of buildings, said walls comprising opposing wall surfaces defining an interior wall cavity, said surfaces having at least one aperture for accessing said wall cavity, said extermination system comprising:
- a fitting installed and mated in said aperture, said fitting comprising means for retaining said fitting in said aperture, said means comprising a plurality of laterally outward-directed protrusions, said fitting having an open interior fitting passage adapted for the introduction of an insecticide into said wall cavity through said fitting passage, whereby insecticide can be introduced into said wall cavities to exterminate insects therein, and whereby said insecticide will be separated by said wall surfaces from occupants of said building.

11. The extermination assembly of claim 7, wherein said laterally outward-directed protrusions are flexible to forces substantially in the direction of the exterior end of said fitting, and substantially inflexible to forces substantially in the direction of said interior end of said fitting, whereby said protrusions will bend to permit insertion of said interior end of said fitting into said aperture, and will flex outward following passage of said protrusions through said aperture, whereby movement of said fitting within said aperture in the direction of said exterior end will cause engagement of said protrusions with a portion of said wall surface about the interior end of said fitting.

12. The extermination assembly of claim 11, wherein said flexible protrusions comprise fins.

13. An extermination system for installation into the walls of buildings, said walls comprising opposing wall surfaces defining an interior wall cavity, said surfaces having at least one aperture for accessing said wall cavity, said extermination system comprising:
- a fitting installed and mated in said aperture, said fitting comprising an interior end substantially positionable in said wall cavity, and an exterior end substantially positionable at an opposite side of said wall surface, said fitting having an open interior fitting passage adapted for the introduction of an insecticide into said wall cavity through said fitting passage, and further comprising means for preventing the return flow of insecticide from said interior end to said exterior end of said fitting, said means for preventing the return flow of insecticide comprising seal means having a closed position preventing the flow of insecticide through said fitting passage, and an open position permitting said flow, said seal means comprising a seal member connected to said fitting through hinge means, said hinge means being adapted to permit movement from said closed position to said open position upon insertion of the outlet of an insecticide supply device, and adapted to provide movement of said seal means from said open position to said closed position upon removal of said outlet, whereby insecticide can be introduced into said wall cavities to exterminate insects therein, and whereby said insecticide will be separated by said wall surfaces from occupants of said building.

14. An extermination system for installation into the walls of buildings, said walls comprising opposing wall surfaces defining an interior wall cavity, said surfaces having at least one aperture for accessing said wall cavity, said extermination system comprising:
- a fitting installed and mated in said aperture, said fitting having an open interior fitting passage adapted for the introduction of an insecticide into said wall cavity through said fitting passage, said fitting comprising an interior end substantially positionable in said wall cavity, and an exterior end substantially positionable at an opposite side of said wall surface, and further comprising means for preventing the return flow of insecticide from said interior end to said exterior end of said fitting, said means for preventing the return flow of insecticide comprising seal means having a closed position preventing the flow of insecticide through said fitting passage, and an open position preventing said flow, said seal means comprising a plurality of flexible panels circumferentially mounted about a portion of said fitting passage so as to substantially prevent the flow of insecticide through said fitting passage, said flexible panels being openable upon the insertion of the outlet of an insecticide supply device, and having an elasticity adapted to return said panels to a closed position when said outlet is removed, whereby insecticide can be introduced into said wall cavities to exterminate insects therein, and whereby said insecticide will be separated by said wall surfaces from occupants of said building.

15. The extermination assembly of claim 14, wherein said flexible panels are substantially triangular in shape, each of said triangular panels being mounted along a side thereof to said fitting.

16. An extermination system for installation into the walls of buildings, said walls comprising opposing wall surfaces defining an interior wall cavity, said surfaces having at least one aperture for accessing said wall cavity, said extermination system comprising:
- a fitting installed and mated in said aperture, said fitting having an open interior fitting passage adapted for the introduction of an insecticide into said wall cavity through said fitting passage, said fitting comprising an interior end substantially positionable in said wall cavity, and an exterior end substantially positionable at an opposite side of said wall surface, and further comprising means for preventing the return flow of insecticide from said interior end to said exterior end of said fitting, said means for preventing the return flow of insecticide comprising seal means having a closed position preventing the flow of insecticide through said fitting passage, and an open position permitting said flow, said seam means comprising an elastomeric diaphragm mounted across a portion of said fitting passage, said diaphragm having a substantially central opening expandable to an open position upon the insertion of the outlet of an insecticide supply device, whereby said outlet can be pushed through said diaphragm to introduce insecticide through said passage and into said wall cavity, said opening will contract following the removal of said outlet to substantially prevent the return flow of insecticide through said passage, and whereby said insecticide will be separated by said wall surfaces from said occupants of said building.

17. An extermination system for installation into the walls of buildings, said walls comprising opposing wall surfaces defining an interior wall cavity, said surfaces having at least one aperture for accessing said wall cavity, said extermination system comprising:
- a fitting installed and mated in said aperture, said fitting having an open interior fitting passage adapted for the introduction of an insecticide into said wall cavity through said fitting passage;
- an insecticide supply device, said insecticide supply device comprising a pressurized supply of insecticide, an interior outlet connected to said supply and adapted for placement into said fitting passage, and an exterior outlet connected to said supply, and means for switching the supply of insecticide between said outlets, whereby insecticide can be introduced into said wall cavities to exterminate insects therein, and whereby said insecticide will be separated by said wall surfaces from occupants of said building.

18. The extermination assembly of claim 17, wherein said interior outlet is connected to said insecticide supply means by flexible connection means, said flexible connection means permitting the insertion of said outlet into said fitting passage from a plurality of different heights and angles relative to said fitting.

19. An extermination system for installation into the walls of buildings, said walls comprising opposing wall surfaces defining an interior wall cavity, said surfaces having at least one aperture for accessing said wall cavity, said extermination system comprising:
- a fitting installed and mated in said aperture, said fitting having an open interior fitting passage adapted for the introduction of an insecticide into said wall cavity through said fitting passage;
- an insecticide supply device, said device including an outlet portion adapted to introduce insecticide into said wall cavity through said fitting passage, and an insecticide supply portion connection to said outlet portion, said outlet being connected to said supply by flexible connection means, said flexible connection means being adapted to permit the insertion of said outlet into said fitting passage from a plurality of different heights and angles relative to said fitting, whereby insecticide can be introduced into said wall cavities to exterminate insects therein, and whereby said insecticide will be separated by said wall surfaces from occupants of said building.

20. An extermination system for installation into the walls of buildings, said walls comprising opposing wall surfaces defining an interior wall cavity, said surfaces having at least one aperture for accessing said wall cavity, said extermination system comprising:

a closure for said aperture fixed to said wall, said closure having seal structure, said seal structure having an open position and a closed position, said seal structure in said open position being adapted to permit the insertion of the outlet of an insecticide supply device through said closure, said seal structure being adapted to return to said closed position upon the removal of said outlet to substantially prevent the return flow of insecticide through said closure.

21. An insecticide supply device comprising a presurized supply of insecticide, an interior outlet connected to said supply and adapted for placement into a fitting passage of a fitting installed in an aperture in a wall surface, said fitting passage permitting access to an interior wall cavity, said interior outlet having a long axis and a plurality of outlet openings disposed substantially radially relative to said long axis, an exterior outlet connected to said supply, said exterior outlet having a plurality of openings adapted to disperse said insecticide substantially in the direction of said long axis of said exterior outlet, and means for switching the supply of insecticide between said outlets.

22. A method for applying an insecticide to a building with walls having wall panels defining interior wall cavities, comprising the steps of:

forming a plurality of apertures in said wall panels to permit access to said wall cavities;

installing in and mating to each of said apertures a fitting having an open interior fitting passage adapted for the introduction of an insecticide into said wall cavity through said fitting passage, said fitting comprising an interior end and an exterior end, said interior end being positioned substantially at an end of said aperture adjacent to said wall cavity, and said exterior end being positioned substantially at an opposite end of said aperture; and, positioning in said passage the outlet of an insecticide supply device adapted to mate with said fitting passage so as to sealably engage said fitting;

operating said insecticide supply device to inject insecticide into said wall cavity; and, removing said outlet of said insecticide supply device from said fitting passage.

* * * * *